No. 792,421. Patented June 13, 1905.

UNITED STATES PATENT OFFICE.

PAUL JULIUS AND ERNST FUSSENEGGER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

AZO DYE ADAPTED TO FORM LAKES.

SPECIFICATION forming part of Letters Patent No. 792,421, dated June 13, 1905.

Application filed February 20, 1905. Serial No. 246,622.

*To all whom it may concern:*

Be it known that we, PAUL JULIUS and ERNST FUSSENEGGER, doctors of philosophy and chemists, subjects of the Emperor of Austria-Hungary, residing at Ludwigshafen-on-the-Rhine, in the Kingdom of Bavaria, German Empire, have invented new and useful Improvements in Azo Coloring-Matters Suitable for Use in the Form of their Lakes, of which the following is a specification.

Our invention relates to the manufacture of new azo coloring-matters which are especially suitable for use in the form of their lakes.

We prepare our new coloring-matters by combining with 2-naphthol-3.6-disulfo-acid a diazotized meta-nitro-amido-benzene which contains a methyl group in the para position to the amido group. The bases which we may make use of include nitro-toluidin ($NH_2:NO_2:CH_3=1:3:4$) and nitro-xylidin, ($NH_2:NO_2:CH_3:CH_3=1:3:4:6$.)

The following example will serve to further illustrate the nature of our invention, which, however, is not confined to this example. The parts are by weight.

Diazotize one hundred and sixty-six (166) parts of nitro-xylidin ($NH_2:NO_2:CH_3:CH_3=1:3:4:6$) and after filtering allow the diazo solution to run slowly into a stirred solution of about three hundred and fifty (350) parts of the sodium salt of 2-naphthol-3.6-disulfo-acid to which sufficient sodium carbonate has been added to maintain the whole alkaline. Stir for thirty (30) minutes after the addition, heat to a temperature of from fifty to sixty degrees centigrade, (50–60° C.,) complete the precipitation of the coloring-matter by means of common salt, filter, press, and dry. The product so obtained is easily soluble in hot water. Its barium salt is insoluble and possesses a bluish-tinted red color. Upon reduction with tin and hydrochloric acid it yields 4.6-diamido-meta-xylene and amido-naphthol-disulfo-acid.

In the above example instead of nitro-xylidin one hundred and fifty-two (152) parts of nitro-toluidin ($NH_2:NO_2:CH_3=1:3:4$) may be employed.

Now what we claim is—

1. As new products, the azo coloring-matters which can be obtained by combining with 2-naphthol-3.6-disulfo-acid a diazotized meta-nitro-amido-benzene which contains a methyl group in the para position to the amido group, which coloring-matters are soluble in hot water and which yield insoluble barium salts, and which upon reduction with tin and hydrochloric acid yield a meta-diamido-benzene with a methyl group in the para position to one of the amido groups.

2. As a new product the azo coloring-matter which can be obtained by combining diazotized nitro-xylidin ($NH_2:NO_2:CH_3:CH_3=1:3:4:6$) with 2-naphthol-3.6-disulfo-acid, which coloring-matter is soluble in hot water and which yields an insoluble barium salt and which upon reduction with tin and hydrochloric acid yields 4.6-diamido-meta-xylene and amido-naphthol disulfo-acid.

In testimony whereof we have hereunto set our hands in the presence of two subscribing witnesses.

PAUL JULIUS.
ERNST FUSSENEGGER.

Witnesses:
   ERNEST F. EHRHARDT,
   JOS. H. LEUTE.